(12) United States Patent
Hanna et al.

(10) Patent No.: US 10,414,895 B2
(45) Date of Patent: Sep. 17, 2019

(54) COLOR DEVELOPMENT OF CARBON BLACK IN EXPANDED POLYSTYRENE

(71) Applicant: Baker Hughes, a GE Company, LLC, Houston, TX (US)

(72) Inventors: Paul Hanna, Sugar Land, TX (US); Hakim Hazaimeh, Richmond, TX (US); William Cottom, Richmond, TX (US)

(73) Assignee: Baker Hughes, a GE compan, LLC, Houston, TX (US)

( * ) Notice: Subject to any disclaimer, the term of this patent is extended or adjusted under 35 U.S.C. 154(b) by 155 days.

(21) Appl. No.: 15/787,169

(22) Filed: Oct. 18, 2017

(65) Prior Publication Data
US 2019/0112448 A1 Apr. 18, 2019

(51) Int. Cl.
| | |
|---|---|
| *C08F 12/08* | (2006.01) |
| *C08F 2/18* | (2006.01) |
| *C08K 5/05* | (2006.01) |
| *C08K 5/053* | (2006.01) |
| *C08K 3/04* | (2006.01) |
| *C09C 1/48* | (2006.01) |
| *C08L 25/06* | (2006.01) |

(52) U.S. Cl.
CPC .................. *C08K 3/04* (2013.01); *C08F 2/18* (2013.01); *C08F 12/08* (2013.01); *C08L 25/06* (2013.01); *C09C 1/48* (2013.01); *C08F 2500/01* (2013.01); *C08F 2500/04* (2013.01)

(58) Field of Classification Search
CPC .................................. C08K 5/05; C08K 5/053
See application file for complete search history.

(56) References Cited

U.S. PATENT DOCUMENTS

| 6,340,713 B1 | 1/2002 | Glueck et al. |
|---|---|---|
| 6,362,242 B1 | 3/2002 | Glueck et al. |

FOREIGN PATENT DOCUMENTS

| EP | 0668139 A1 | 8/1995 |
|---|---|---|
| EP | 372343 B1 | 1/2000 |
| EP | 1925418 A1 | 5/2008 |

OTHER PUBLICATIONS

Cottom, W. P., "Additives for Expanded Polystyrene Suspension Formulations", IP.com, IPCOM000244928D, Feb. 1, 2016.
Lopes, Christina N., et al., "Effect of Initiator on the Incorporation of Graphite into Polymer Matrix During Suspension Polymerization", Macromol. Symp. 2005, 229, 72-80.
Trommsdorff, U., et al., "Melt Impregnation Technology: Enhancement of the Thermal Resistance of EPS with Carbon Black", FOAMS 2015 Conference, Sep. 10-11, 2015, 7 pages.

*Primary Examiner* — Wenwen Cai
(74) *Attorney, Agent, or Firm* — Mossman, Kumar & Tyler, P.C.

(57) ABSTRACT

When long chain primary alcohols are into expanded polystyrene (EPS) containing an additive such as carbon black or graphite to give gray EPS, the long chain primary alcohols act as color enhancing agents and generate a darker color as compared with an otherwise identical gray EPS absent the additive.

17 Claims, No Drawings

COLOR DEVELOPMENT OF CARBON BLACK IN EXPANDED POLYSTYRENE

TECHNICAL FIELD

The present invention relates to methods for preparing expanded polystyrene (EPS), and more particularly relates, in one non-limiting embodiment, to methods for preparing gray EPS using carbon black and/or graphite.

TECHNICAL BACKGROUND

Expandable Polystyrene (EPS) has been made using suspension polymerization for over 50 years. Multiple formulation systems have been used depending on the equipment available, polymerization process used, and desired end use properties. EPS can be made using multiple techniques, including extrusion of polystyrene with addition of blowing agents through underwater dies to form expandable beads or suspension polymerization of styrene monomer with subsequent addition of blowing agents.

The addition of graphite and/or carbon black to make gray (or grey) EPS has been practiced for over 15 years. Grades and types of graphite and/or carbon black are selected to provide the desired end use properties. More specifically, carbon black and/or graphite can be added to EPS to improve the aesthetics or to improve the function of the finished EPS part. For improved aesthetics, generally the desired effect is to provide a consistent color. The amount of color can be measured visually by comparing to standards, or measured by instruments to determine reflectance, and color shifts.

For improved function, tests are normally run on a finished part. One example of improved function is for insulation grade EPS. Normal "white" grade EPS provides efficient, light weight insulation, and is widely used for home and commercial building construction. Improved insulation values have been obtained by adding graphite or carbon black to insulation grade EPS to give gray EPS. These grades provide improved insulation performance (measured as thermal conductivity, or lambda) vs. the normal "white" grades when formed at the same mass, or can provide equal insulation when formed at lesser mass.

For good color development in gray EPS, the carbon black and/or graphite must be dispersed efficiently within the EPS. This can be accomplished through the use of mechanical shear, dispersing agents, or a combination of dispersing agents with mechanical shear. Additionally, processes for production of carbon black and/or graphite can be modified to change the surface characteristics of the carbon black and/or graphite particles, and improve the ability to disperse these particles within polymers such as EPS.

The efficient mixing of carbon black and/or graphite in EPS can be made easier through the use of carbon black and/or graphite masterbatches, where relatively high concentrations of carbon black and/or graphite have been mixed with polystyrene under high shear conditions and then extruded to form pellets. The use of dispersing agents may also be used in combination with the high shear conditions to make masterbatches. The masterbatches also have the advantage of creating less dust while handling carbon black and/or graphite.

As previously noted, the addition of carbon black and/or graphite is known to improve the insulation values of EPS beads. For EPS produced using the extrusion method, the addition of carbon black and/or graphite is established art. However, producing gray EPS using the suspension polymerization method is more challenging. The addition of carbon black and/or graphite to the suspension formulation can create emulsion instability, leading to poor bead size distribution or even invert the emulsion from styrene in water to water in styrene, which can lead to gelling of the reactor. Previous art teaches that the suspension method may be used, but notes the addition of about 3-20% polystyrene to the styrene monomer improves the stability. It has been found that achieving desired bead distributions and cell structure can be difficult even using these levels or even higher amounts of polystyrene.

Additionally, the carbon black and/or graphite can interact with the free radical initiators, requiring much higher levels of the free radical initiators to achieve the targeted amount of polymerization. The interactions between the free radical initiators and carbon black and/or graphite can also create a variation in the polymerization rate.

Currently, preventing the instability requires careful monitoring of the reactor mass, including measuring the amount of conversion and estimation of bead size and distribution. Frequently, increases in the amount of radical initiator, surfactant and stabilizer are required to attempt to keep the emulsion stable with the proper bead size and bead size distribution. While this is possible in small laboratory and pilot reactors, it is much less practical for larger scale reactors.

Many EPS formulations already employ polyethylene wax as a processing agent to improve the cell structure of the EPS bead. Polyethylene waxes can also provide improvement for dispersion of carbon black or graphite within the EPS bead, as disclosed in W. P. Cottom, "Additives for Expanded Polystyrene Suspension Formulations", IP.com, IPCOM000244928D, 1 Feb. 2016), as well as minimize the interaction between the carbon black and/or graphite and the free radical initiator. Other products disclosed included alcohols, ethoxylates, carboxylic acids, polymers, copolymers, oxidized polyethylenes, and modified waxes.

It has been confirmed that many of those products could minimize the interaction between the carbon black and/or graphite and the radical initiator. Additionally, adding up to 20% polystyrene can also improve stability. However, it was still very difficult to obtain the desired bead size and distribution using existing methods. The process required monitoring the conversion on a frequent basis, with multiple additions of radical initiator, surfactant, and dispersing agent even when making laboratory scale batches. Based on the inventors' experience, the process was not robust enough to transfer to commercial scale reactions.

It would thus be desirable to devise a method for preparing gray EPS with molecular weight, bead size, bead size distribution, and cell nucleation by suspension polymerization similar to those of white EPS on a consistent basis, but with a uniform color, or even darker color than is possible with known methods.

SUMMARY

There is provided in one non-restrictive version, a method for preparing gray expanded polystyrene (EPS), where the method includes introducing styrene monomer and a polymerization initiator to a suspension polymerization formulation; introducing to the suspension polymerization an additive selected from the group consisting of carbon black, graphite, and combinations thereof; before, during or after introducing the additive, introducing to the suspension polymerization formulation at least one color enhancing agent selected from the group consisting of long chain primary alcohols, long chain primary alcohols modified with a polar group, and combinations thereof, where the long chain primary alcohols have a weight average molecular weight of from about 250 amu to about 2000 amu; and polymerizing the styrene monomer to polystyrene by suspension polymerization to produce gray EPS.

DETAILED DESCRIPTION

An improved color enhancing agent for providing color while using carbon black and/or graphite to make gray EPS has been recently discovered. Long chain primary alcohols can be added to gray suspension grade EPS formulations to make the finished EPS bead darker as compared with an otherwise identical gray EPS bead without the additive. The long chain primary alcohols can be added at any time and at different times during the suspension polymerization process, either in a single introduction or multiple introductions. In nonlimiting embodiment, the method herein can decrease the L value by at least 40%; alternatively by at least 30%; and in another non-restrictive version by at least 20%. The average "L" value shows relative values of black, with lower numbers being more black, as measured by a HunterLab MiniScan EZ Spectrophotometer.

It was further found that while all long chain primary alcohols with weight average molecular weights of greater than 425 amu give some positive improvement in color, those with molecular weight of ca. 1000 amu give the best performance. This was unexpected and surprising since the lower molecular weight materials have more alcohol functionality per unit weight. The effectiveness decreases with molecular weight of ca. 2000 amu. Thus, in one non-limiting embodiment, the long chain primary alcohols have a weight average molecular weight of from about 250 amu independently to about 2000 amu; alternatively from about 850 independently to about 1500 amu. In different non-restrictive versions, upper or lower Mw limits may be independently about 700 amu and independently about 1000 amu. As used herein with respect to a range, the term "independently" means that any threshold may be used together with another threshold to give a suitable alternative range. For instance in this case, a suitable alternative range may be between about 700 amu to about 1500 amu.

In particular it was unexpectedly found that long chain primary alcohols, especially those with a molecular weight of ca. 1000 amu generated a much darker color than similar levels of other color enhancing agents such as polyethylenes. Long chain primary alcohols with higher mw values (about 2000 amu) and lower mw values (about 700 amu) also generally provided darker color development as compared to polyethylenes, but not as dark as the alcohols with mw of about 1000 amu in some instances. It is believed that the combination of molecular weight and functionality are important to the performance. The alcohol functionality of the about 1000 amu primary alcohol was modified to be terminated with about five ethoxylate units, and experiments obtained still darker color than polyethylenes or shorter chain primary alcohols. The long chain primary alcohols can also optionally be modified with groups such as ethoxylates or other polar groups to give positive results. In one non-limiting embodiment, the long chain primary alcohols modified with a polar group comprise long chain primary alcohols are modified with 0 independently to 7 ethoxylate groups; alternatively from about 1 independently to about 5 ethoxylate groups. Other polar groups besides ethoxylate groups include, but are not necessarily limited to polyvinyl-alcohols, carboxylic acids, maleic derivatives, esters, amines, amides, and combinations thereof.

The long chain primary alcohol color enhancing agents can also provide other benefits, including, but not necessarily limited to, good cell nucleation, good maturation, and other properties that enable the use of gray EPS in applications such as insulation.

In one non-limiting embodiment the long chain primary alcohol color enhancing agent proportion ranges from about 500 independently to about 3000 ppm based on the styrene monomer present; alternatively from about 600 independently to about 1500 ppm based on the styrene monomer present; and in one non-restrictive version about 1000 ppm based on the styrene monomer present.

For the purposes of the present method, expanded styrene polymers are styrene polymers containing blowing agents. The blowing agents may be conventional.

The target parameters of the gray EPS produced by the method described herein will vary depending on the item to be made and its ultimate end use. With respect to gray EPS molecular weight, in one non-limiting embodiment the gray EPS has a weight average molecular weight between about 50,000 independently to about 1,000,000 amu; alternatively from about 150,000 to about 750,000 amu. A precise or actual mw is not that relevant since customers choose different molecular weights to accomplish different purposes in different applications. The method described herein permits reproducibly forming the beads of any target molecular weight size.

Similarly, a target range for bead size will vary depending on the part to be made. In one non-restrictive version, the gray EPS has a bead size between about 500 independently to about 1500 microns; alternatively between about 850 independently to about 1170 microns. Nevertheless other ranges may be used for making different parts.

With respect to bead size distribution, sometimes a customer may want a broad distribution to hit multiple targets with one run, but generally a customer wants a high concentration in the target range. In one non-limiting embodiment, suitable bead distribution is from about 10 independently to about 90 weight % of the beads in the range of about 850 independently to about 1170 microns; alternatively from about 35 independently to about 90 weight % of the beads in the range of about 850 independently to about 1170 microns.

The desired cell structure generally means that the cell structure is uniform so that the expansion will be uniform. A preferred range for cell size will vary depending on the part to be made. It can be important to be able to adjust the method to hit the desired target. In one non-limiting embodiment, the cell size ranges between about 4 independently to about 20 cells per millimeter; alternatively the cell size ranges between about 8 independently to about 16 cells per millimeter.

In one non-restrictive version, the polystyrene density may range from about 5 independently to about 35 g/l (grams/liter), alternatively from about 8 independently to about 25 g/l, and in another non-limiting embodiment from about 10 independently to about 15 g/l.

There are many ways to control the introduction of carbon black and/or graphite to the formulation. One convenient, non-limiting way is to use carbon black and/or graphite which has been predispersed into polystyrene as a masterbatch. When the masterbatch is added to the suspension formulation at the proper time, the polystyrene portion of the masterbatch starts dissolving into the styrene monomer. The dissolving rate is controlled by the molecular weight of the polystyrene used in the masterbatch, the size of the masterbatch pellets, the amount of remaining styrene monomer, the reaction temperature, and the stirring rate. This process allows the carbon black and/or graphite to also be evenly dispersed into the monomer droplets. Essentially any molecular weight masterbatch may be used, in any size pellets. What may be important is that it will take longer to dissolve with higher molecular weights and bigger pellets.

In the predispersed masterbatch embodiment, the reaction temperature may range from about 80 independently to about 100° C. followed by about 110 independently to about 140° C.; alternatively the reaction temperature may range from about 85 independently to about 95° C. followed by about 125 independently to about 135° C.

Stirring rates depend on reactor conditions and are not necessarily a limiting factor for the methods described herein. What is important is good mixing. For the experiments described below, a suitable range in our system has been found to be from about 200 independently to about 600 rpm; alternatively from about 300 independently to about 450 rpm.

With respect to the free radical initiator used for the predispersed masterbatch embodiment, two initiators are used: a primary initiator and a secondary initiator. These may be the same initiator, just added at different times. A primary free radical initiator may be active at about 90° C. in an amount from about 0.3 wt % independently to about 0.5 wt % based on the styrene monomer in the system and a secondary free radical initiator active at about 130° C. in an amount from about 0.1 to about 0.3 wt % based on the styrene monomer in the system. Alternatively, a primary free radical initiator may be active at about 90° C. in an amount from about 0.35 independently to about 0.45 wt % based on the styrene monomer, and a secondary free radical initiator which is active at about 130° C. in an amount from about 0.15 to about 0.25 wt % based on the styrene monomer.

A second embodiment to control the addition of carbon black and/or graphite is to add fluff or powder grades to the white formulation. The interaction between the carbon black and radical initiator dramatically slows down the polymerization rate. In one non-limiting embodiment this slow rate is held for an optimized period of time to allow for the droplet size to equilibrate to the desired range. Again, this optimized period of time depends on many factors including the target parameters for the gray EPS and thus even a general time period or range is difficult to specify. The optimized period of time will also depend upon the size of the reactor in the plant. An additional dose of radical initiator can then be added to complete the polymerization. With more specificity, a free radical initiator may be in an initial dose and in an additional or subsequent dose, for instance an initial dose in an amount from about 3 independently to about 5 grams, and a free radical initiator is in an additional dose in an amount from about 0.4 independently to about 0.6 wt % based on the styrene monomer in our scale system. Alternatively, a free radical initiator may be in an initial dose in an amount from about 0.35 independently to about 0.45 wt % based on the styrene monomer, and a free radical initiator is in an additional dose in an amount from about 0.45 independently to about 0.55 wt % based on the styrene monomer. The initiator for the initial and additional doses may be the same or different.

It is expected that a wide size range of fluff and wide range of powder grades may be used. In one non-limiting embodiment the proportion of fluff or powder grade ranges from about 5 independently to about 10 wt % based on the styrene monomer; alternatively ranges from about 6 independently to about 8 wt % based on the styrene monomer.

Similarly to the first embodiment of using a predispersed masterbatch, using the second embodiment of introducing fluff or powder grade carbon black or graphite, the slowing down of the polymerization rate will vary depending upon reaction conditions.

A third non-restrictive embodiment of the method herein is to combine the predispersed masterbatch and the fluff/powder grade procedures. The fluff or powder grade may be added at the same time as the masterbatch or they may be added at different times. If added at the same time, more time should be allowed for the polystyrene in the masterbatch to dissolve in the remaining styrene monomer before adding the additional dose of radical initiator.

In this non-limiting combination version, the amount of masterbatch pellets may range from about 10 independently to about 22.5 wt % based on the styrene monomer; alternatively from about 150 independently to about 200 wt % based on the styrene monomer. The amount of fluff and/or powder grade carbon black and/or graphite may range from about 0.1 independently to about 1 wt %, alternatively from about 0.2 independently to about 0.4 wt % based on the styrene monomer. For the free radical initiator, an initial and an additional or subsequent dose may be used where the initial dose may range from about 0.3 independently to about 0.5 wt % based on the styrene monomer; alternatively from about 0.35 independently to about 0.45 wt % based on the styrene monomer. Similarly, the additional dose may range from about 3 independently to about 5 wt % wt %; alternatively from about 0.35 independently to about 0.45 wt % based on the styrene monomer. In this third, non-restrictive version, the amount of remaining styrene monomer after three hours may be from about 70 independently to about 20 wt %; alternatively from about 60 independently to about 40 wt %.

Generally for the method described herein, the proportions of carbon black and/or graphite based on the resulting styrene polymer range from about 0.1 independently to about 10 wt %; alternatively from about 3 independently to about 8 wt %. The graphite used suitably has an average particle size of from about 1 independently to about 50 µm; alternatively from about 2.5 independently to about 12 µm. The graphite may also have a bulk density of from about 100 to about 500 g/l and a specific surface area of from about 5 to about 20 $m^2/g$, in a non-limiting embodiment. Natural graphite or synthetic graphite may be used. There are no particular restrictions on the size of carbon black particles or powders. The particles are small, but work together as larger aggregates, and thus the individual particle size is not relevant.

Conventional surfactants and color enhancing agents may be used in addition to the long chain primary alcohols described herein. A particular, nonlimiting suitable surfactant is sodium dodecyl benzene sulfonate. Other particular, suitable non-limiting dispersing agents include, but are not necessarily limited to tricalcium phosphate and magnesium pyrophosphate. The amounts or proportions of surfactant or color enhancing agent are adjusted to produce the desired bead size. To get the desired bead size and bead size distribution, it may be necessary to add additional surfactant and/or color enhancing agent when adding the carbon black and/or graphite to the formulation. Under the process described herein, there is time for the additional surfactant and/or color enhancing agent to create the desired bead size and bead size distribution before the polymer's viscosity is too high for the bead size to equilibrate.

Any suitable, conventional initiator may be used in the method described herein. In non-limiting embodiments, dibenzoyl peroxide may be used as a primary or initial initiator at a temperature of about 90° C., whereas t-butylperoxy benzoate may be used as a secondary or additional initiator at a temperature of about 130° C.

The styrene polymers described herein can contain the customary and known auxiliaries and additives, for example flame retardants, nucleating agents, UV stabilizers, chain transferrers, chain extenders, blowing agents, plasticizers, pigments and anti-oxidants.

Additionally, it will be recognized that comonomers compatible with styrene to be copolymerized therewith may also be included; suitable ethylenically unsaturated comonomers include, but are not necessarily limited to, alkylstyrenes, divinylbenzene, acrylonitrile, α-methylstyrene and combinations thereof.

It will be appreciated that the method described herein may be implemented in a wide variety of ways. The following Examples are provided to simply illustrate the method of late introduction of the additive and are not intended to limit the method or invention in any way.

Example 1

1040 grams of reagent grade styrene was added to 1688 grams of deionized water in a 4 L pressure-resistant stirred reactor. 6 grams of tricalcium phosphate (TCP), 0.06 grams of NACCONOL® 90 G (Stepan Company), 3.75 grams of dibenzoyl peroxide (BPO), 1 gram of t-butyl peroxybenzoate (TBPB), 0.375 grams of calcium carbonate, and 1.125 grams of UNILIN™ 1000 alcohol (Baker Hughes, a GE company) were added to the reactor before purging with nitrogen and sealing. The mixture was heated rapidly to 90° C. with stirring. After polymerizing for 2 hours at 90° C., 175 grams of PS6310 (master batch of carbon black in polystyrene, supplied by Cabot Corporation), 54 grams of TCP, 0.41 grams of NACCONOL 90G, and 1.125 grams of calcium carbonate were added to the reactor. The reactor was sealed and the polymerization continued for 0.5 hours. The reactor was then opened again, and 3 grams of CSX938F (carbon black fluff supplied by Cabot Corporation) was added to the reactor. The reactor was sealed and held at 90° C. After equilibrating for 30 minutes, an additional 4 grams of BPO was added to the reactor. The reactor was sealed and held at 90° C. for an additional (90) minutes. 128 grams of pentane was then added to the reactor and heated rapidly to 130° C. and held for 3 hours. The reactor was then cooled to 60° C. or less while stirring. The polystyrene beads were washed with water and dried. The beads were then classified by size in a Gilson shaker using #10 (2000 microns), 14 (1400 microns), 16 (1180 microns), 20 (855 microns), 25 (710 microns), 30 (600 microns), 35 (500 microns), and 45 (355 microns) sieves.

Example 2

Example 2 was conducted similarly to Example 1 except that 1.125 grams of POLYWAX™ 1000 polyethylene (Baker Hughes, a GE company) was used instead of UNILIN™ 1000 alcohol.

Example 3

Example 3 was conducted similarly to Example 1, except that 1.125 grams of VYBAR™ 103 polymer (Baker Hughes, a GE company) was used instead of UNILIN™ 1000 alcohol.

Example 4

Example 4 was conducted similarly to Example 1, except that 1.125 grams of UNILIN™ 2000 alcohol (Baker Hughes, a GE company) was used instead of UNILIN™ 1000 alcohol.

Example 5

Example 5 was conducted similarly to Example 1, except that 1.125 grams of UNITHOX™ 1020 ethoxylate (Baker Hughes, a GE company) was used instead of UNILIN™ 1000 alcohol.

Example 6

Example 6 was conducted similarly to Example 1, except that 1.125 grams of POLYWAX™ 2000 polyethylene (Baker Hughes, a GE company) was used instead of UNILIN™ 1000 alcohol.

Example 7

Example 7 was conducted similarly to Example 1, except that 1.125 grams of stearyl alcohol (Lipo Chemical) was used instead of UNILIN™ 1000 alcohol.

Example 8

Example 8 was conducted similarly to Example 1, except that 2.25 grams of UNITHOX™ 1020 ethoxylate (Baker Hughes, a GE company) was used instead of UNILIN™ 1000 alcohol.

Example 9

Example 9 was conducted similarly to Example 1, except that 0.5625 grams of UNILIN™ 1000 alcohol was used.

Example 10

Example 10 was conducted similarly to Example 1, except that 0.625 grams of UNILIN™ 1000 alcohol and 0.75 grams of POLYWAX™ 1000 polyethylene were used.

The polystyrene beads captured on screen 14 for each Example were placed in a dish to a depth of approximately 1 in (2.5 cm) The color was measured using a HunterLab MiniScan EZ meter.

The average "L" value shows relative values of black, with lower numbers being more black. The values for Experiments 1-10 are shown below in Table I. It may be seen from Table I that by using the long chain primary alcohol color enhancing agents described herein in Examples 1, 5, 8, 9, and 10 that a darker black color was obtained as compared with otherwise identical gray EPS that used different color enhancing agents.

TABLE I

| L Values for Examples 1-10 | |
| --- | --- |
| Example | L value |
| 1 | 13.5 |
| 2 | 31.5 |
| 3 | 34 |
| 4 | 25 |
| 5 | 14.6 |

TABLE I-continued

L Values for Examples 1-10

| Example | L value |
|---------|---------|
| 6 | 30 |
| 7 | 23 |
| 8 | 16 |
| 9 | 15 |
| 10 | 15 |

In the foregoing specification, the invention has been described with reference to specific embodiments thereof, and has been demonstrated as effective in providing methods producing gray EPS by suspension polymerization. However, it will be evident that various modifications and changes can be made thereto without departing from the broader scope of the invention as set forth in the appended claims. Accordingly, the specification is to be regarded in an illustrative rather than a restrictive sense. For example, different types and proportions of long chain primary alcohol color enhancing agents, different proportions of carbon black and/or graphite additive, different gray EPS densities, different gray EPS weight average molecular weights, different gray EPS bead sizes, different gray EPS bead distributions, different gray EPS cell sizes, different free radical initiators and proportions thereof, different surfactants and proportions thereof, different color enhancing agents and proportions thereof, different process parameters, from those described and exemplified herein are nevertheless encompassed.

The present invention may suitably comprise, consist of or consist essentially of the elements disclosed and may be practiced in the absence of an element not disclosed. For instance, there may be provided a method for preparing gray expanded polystyrene (EPS), where the method consists essentially of or consists of introducing styrene monomer and a polymerization initiator to a suspension polymerization formulation; introducing to the suspension polymerization an additive selected from the group consisting of carbon black, graphite, and combinations thereof; before, during or after introducing the additive, introducing to the suspension polymerization formulation at least one color enhancing agent selected from the group consisting of long chain primary alcohols, long chain primary alcohols modified with a polar group, and combinations thereof, where the long chain primary alcohols have a weight average molecular weight of from about 250 amu to about 2000 amu; and polymerizing the styrene monomer to polystyrene by suspension polymerization to produce gray EPS, where the method comprises, consists essentially of, or consists of introducing conventional EPS additives.

As used herein, the terms "comprising," "including," "containing," "characterized by," and grammatical equivalents thereof are inclusive or openended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for preparing gray expanded polystyrene (EPS), the method comprising:
    polymerizing styrene monomer and a polymerization initiator by suspension polymerization;
    introducing into the suspension polymerization an additive selected from the group consisting of carbon black, graphite, and combinations thereof;
    before, during or after introducing the additive, introducing into the suspension polymerization at least one color enhancing agent selected from the group consisting of long chain primary alcohols, long chain primary alcohols modified with a polar group, and combinations thereof, where the long chain primary alcohols have a weight average molecular weight of from about 250 amu to about 2000 amu; and
    continuing to polymerize the styrene monomer to polystyrene by suspension polymerization to produce gray EPS.

2. The method of claim 1 where the long chain primary alcohols modified with a polar group comprise long chain primary alcohols modified with 1 to 7 ethoxylate groups.

3. The method of claim 1 where the amount of at least one color enhancing agent ranges from about 500 to about 3000 ppm based on the styrene monomer present.

4. The method of claim 1 where the gray EPS is darker than an identical gray EPS absent the color enhancing agent.

5. The method of claim 1 where the gray EPS:
    has a weight average molecular weight between about 50,000 and about 1,000,000 amu;
    has a bead size between about 500 and about 1500 microns;
    has a bead distribution where from about 10 to about 90 weight % of the beads are in the range of about 850 to about 1170 microns; and
    has a cell size between about 4 and about 20 cells per millimeter.

6. The method of claim 1 where the gray EPS has a density from about 5 to about 35 g/l.

7. The method of claim 1 where the amount of additive ranges from about 0.1 to about 10 wt %, based on the produced gray EPS.

8. A method for preparing gray expanded polystyrene (EPS), the method comprising:
    polymerizing styrene monomer and a polymerization initiator by suspension polymerization;

introducing into the suspension polymerization an additive selected from the group consisting of carbon black, graphite, and combinations thereof, where the amount of additive ranges from about 0.1 to about 10 wt %, based on the produced gray EPS; and before, during or after introducing the additive, introducing into the suspension polymerization at least one color enhancing agent selected from the group consisting of long chain primary alcohols, long chain primary alcohols modified with a polar group, and combinations thereof, where the long chain primary alcohols have a weight average molecular weight of from about 250 amu to about 2000 amu, where the amount of additive ranges from about 500 to about 3000 ppm based on the styrene monomer present; and continuing to polymerize the styrene monomer to polystyrene by suspension polymerization to produce gray EPS.

9. The method of claim 8 where the long chain primary alcohols modified with a polar group comprise long chain primary alcohols modified with 1 to 7 ethoxylate groups.

10. The method of claim 8 where the gray EPS is darker than an identical gray EPS absent the color enhancing agent.

11. The method of claim 8 where the gray EPS:
has a weight average molecular weight between about 50,000 and about 1,000,000 amu;
has a bead size between about 500 and about 1500 microns;
has a bead distribution where from about 10 to about 90 weight % of the beads are in the range of about 850 to about 1170 microns; and
has a cell size between about 4 and about 20 cells per millimeter.

12. The method of claim 8 where the gray EPS has a density from about 5 to about 35 g/l.

13. A method for preparing gray expanded polystyrene (EPS), the method comprising:

polymerizing styrene monomer and a polymerization initiator by suspension polymerization;

introducing into the suspension polymerization an additive selected from the group consisting of carbon black, graphite, and combinations thereof; and before, during or after introducing the additive, introducing into the suspension polymerization at least one color enhancing agent selected from the group consisting of long chain primary alcohols, long chain primary alcohols modified with a polar group, and combinations thereof, where the long chain primary alcohols have a weight average molecular weight of from about 250 amu to about 2000 amu; and continuing to polymerize the styrene monomer to polystyrene by suspension polymerization to produce gray EPS, where the gray EPS is darker than an identical gray EPS absent the additive, and has a density from about 5 to about 35 g/l.

14. The method of claim 13 where the long chain primary alcohols modified with a polar group comprise long chain primary alcohols modified with 1 to 7 ethoxylate groups.

15. The method of claim 13 where the amount of at least one color enhancing agent ranges from about 500 to about 3000 ppm based on the styrene monomer present.

16. The method of claim 13 where the gray EPS:
has a weight average molecular weight between about 50,000 and about 1,000,000 amu;
has a bead size between about 500 and about 1500 microns;
has a bead distribution where from about 10 to about 90 weight % of the beads are in the range of about 850 to about 1170 microns; and
has a cell size between about 4 and about 20 cells per millimeter.

17. The method of claim 13 where the amount of additive ranges from about 0.1 to about 10 wt %, based on the produced gray EPS.

* * * * *